Jan. 13, 1931.   L. WEISENBACH   1,789,060
BONE FRACTURE CLAMP
Filed Sept. 29, 1928
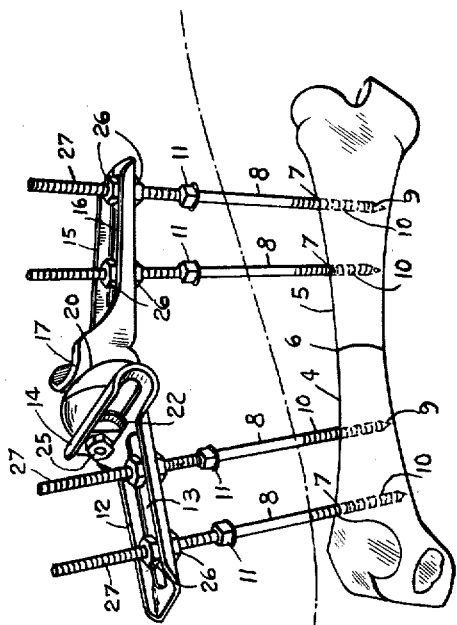
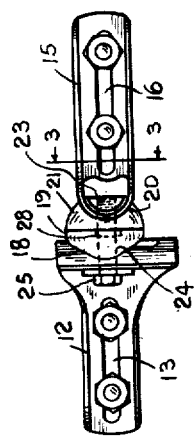
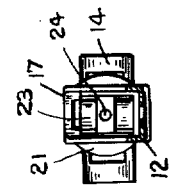
Inventor
Leo Weisenbach
By his Attorney
Clarence G. Campbell Patented Jan. 13, 1931

1,789,060

UNITED STATES PATENT OFFICE

LEO WEISENBACH, OF CEDARHURST, NEW YORK, ASSIGNOR TO THE KING-SCHEERER CORPORATION OF AMERICA, OF NEW YORK, N. Y., A CORPORATION OF NEW YORK

BONE-FRACTURE CLAMP

Application filed September 29, 1928. Serial No. 309,139.

My invention relates to improvements in a bone fracture clamp and consists of the combination, adaptation and arrangement of parts as will be more fully hereinafter pointed out.

The art of setting fractured bones is very ancient and many devices have been devised for carrying out the same, but all of the devices so devised either require a second operation, have a difficult technique or interfere with the proper circulation of blood to insure an early and correct setting of the fracture.

My device eliminates all of these difficulties and furnishes a device which does not require a second operation, eliminates the necessity of prolonged working in the opened wound, does not strip the periosteum, nor disturb the clot between the ends of the bone, nor strangle the same, and permits of very early massage. Furthermore, the technique is so simplified that even the inexact drilling of holes to receive the anchor screws is overcome by the complete universal joint manipulation made possible by my structure.

The original technique in the fixation of the two bone parts in a fractured bone is simple and positive with my device and can be carried out easily and readily with the use of the X-ray to insure a perfect set and the fracture can be readjusted quickly and easily by the mere loosening of one nut permitting the adjustment of the universal joint. Furthermore, the fixation is much greater than in any of the devices heretofore known.

One of the greatest advantages of my device over the prior art devices is in the universal joint structure which permits both vertical and horizontal adjustment of the fracture for the original setting or re-setting of a bone fracture.

Referring to the drawings, Fig. 1 is a perspective of my complete device in use on the bone of the forearm, and the hand and forearm are shown in dotted outline;

Fig. 2 is a top plan view of my device;

Fig. 3 is an end view of Fig. 2 on the line 3—3 looking in from the right hand end.

In the drawings 4 and 5 are portions of the bone of a forearm which is fractured at 6. In using my bone fracture clamp to hold this fracture in correct position after setting it is necessary to first make an incision in the arm to the bone. Then by means of a Stille-Sherman revolving drill or other similar drill make the necessary holes in the bone portions 4 and 5 at 7. Anchor screws 8 having points 9 and threads 10 of narrow shoulders and long flanges will then be screwed into the holes 7 by means of a hollow T wrench adapted to fit over said screws 8 to engage integral nut portions 11 on said screws 8.

Clamp member 12 has a slot 13 and terminates at its inner end in an upwardly curved portion 14. A second clamp member 15 has a slot 16 and terminates at its inner end in a curved portion 17. The curved portion 14 of clamp member 12 is adapted to fit into a curved portion 18 of a universal joint member 19 and curved portion 17 of clamp member 15 fits into a curved portion 20 of a second universal joint member 21. A curved binding member 22 is adapted to fit the upwardly curved member 14 and a second curved binding member 23 is adapted to fit the curved portion 17 of the clamp member 15. A circular centering plate 28 projects from member 21 and engages a similar pocket in member 19. A bolt 24 rigidly secured to binding member 23 is threaded at its opposite end and a nut 25 is adapted to be secured thereon to rigidly lock the binding members 22 and 23 and the clamp members 12 and 15 and the universal joint members 19 and 21 together. Slots 13 and 16 of the clamp members 12 and 15 are adapted to slide over anchor screws 8 and said clamp members 12 and 15 are rigidly secured over said screws 8 by means of and between nuts 26 which thread on threaded portions 27 of the anchor screws 8.

It will readily be understood that after the anchor screws 8 have been mounted in the portions 4 and 5 of the fractured bone and the clamp members 12 and 15 have been rigidly secured on said screws 8 as described that the fracture 6 can then be correctly set by the accepted practice and the curved portions 14 and 17 of the clamp members 12 and 15 turned and the universal joint members 19 and 21 also turned so that the bone portions 4 and 5 are held in the desired position with the fracture 6 correctly set and the nut 25 tightened so as to rigidly lock the clamp members 12 and 15 and their connections in the desired position to hold anchor screws 8 and the bone portions 4 and 5 rigidly in the desired position.

I claim:

1. In a bone fracture clamp the combination of anchor screws adapted to screw into and anchor in each section of a fractured bone, two clamp members slotted so as to slide over the respective sets of anchor screws and be rigidly secured thereto, a universal joint connecting said clamp members and means for locking said universal joint, anchor screws, and both sections of a fractured bone rigidly in any desired position.

2. In a bone fracture clamp the combination of anchor screws adapted to screw into and anchor in each section of a fractured bone, two clamp members slotted so as to slide over the respective sets of anchor screws and be rigidly secured thereto, a universal joint connecting said clamp members and means for locking said clamp members in any desired relation to each other whereby the said anchor screws and two or more sections of fractured bone are rigidly held in the desired knitting position.

3. In a bone fracture clamp the combination of anchor screws adapted to screw into and anchor in each section of a fractured bone, two clamp members slotted so as to slide over the respective sets of anchor screws and be rigidly secured thereto, a universal joint connecting said clamp members and means for locking said clamp members in any desired relation to each other by locking said universal joint in a fixed position whereby the said anchor screws and the fractured bone sections are rigidly held in the desired position for healing.

4. In a bone fracture clamp the combination of screw anchoring means mounted in each portion of a fractured bone, a pair of clamp members each adapted to be rigidly secured to one of the two sets of anchor screws, a universal joint connecting said clamp members and means for rigidly locking said universal joint in the desired position whereby the said anchor screws and the fractured bone sections are rigidly held in and may be adjusted to and locked in the desired technical healing position.

5. In a bone fracture clamp the combination of screw anchoring means mounted in each portion of a fractured bone, a pair of clamp members each adapted to be rigidly secured to one of the two sets of anchor screws, a universal joint connecting said clamp members and means for rigidly locking said clamp members in any desired relation to each other whereby the said anchor screws and the fractured bone sections controlled thereby are rigidly held in and may be adjusted to and locked in the desired technical knitting position.

6. In a bone fracture clamp the combination of screw anchoring means mounted in each portion of a fractured bone, a pair of clamp members each adapted to be rigidly secured to one of the two sets of anchor screws, a universal joint connecting said clamp members and means for rigidly locking said clamp members in any desired relation to each other by locking said universal joint in a fixed position whereby the said anchor screws and the fractured bone sections controlled thereby are rigidly held in and may be adjusted to and locked in the desired technical healing position.

7. In a bone fracture clamp the combination of anchor screws adapted to screw into and anchor in each section of a fractured bone, two clamp members slotted so as to slide over the respective sets of anchor screws and be rigidly secured thereto, and terminating at their adjoining ends in curved sections adapted to fit similarly curved portions in two universal joint members having a common circular central plane and a circular projecting portion in one of said universal joint members engaging a similar cut out in the other universal joint member and means for rigidly locking said clamp and universal joint members securely together in any desired position whereby the said anchor screws and the fractured bone sections controlled thereby are rigidly held in and may be adjusted to and locked in the desired technical healing position by the rigid locking means.

8. In a bone fracture clamp the combination of anchor screws adapted to screw into and anchor in each section of a fractured bone, two clamp members slotted so as to slide over the respective sets of anchor screws and be rigidly secured thereto, and terminating at their adjoining ends in curved sections adapted to fit similarly curved portions in two universal joint members having a common circular central plane and a circular projecting portion in one of said universal joint members engaging a similar cut out in the other universal joint member and means for rigidly locking said clamp and universal joint members securely together in any desired position comprising curved binding members engaging said curved sections of the clamp members and a bolt and nut cooperating therewith whereby the said anchor screws and the fractured bone sections controlled thereby are rigidly held in and may be adjusted to and locked in the desired technical healing position by the said clamp members and bolt and nut cooperating therewith.

9. In a bone fracture clamp the combination of anchor screws adapted to screw into and anchor in each section of a fractured bone, two clamp members slotted so as to slide over the two sets of anchor screws anchored in each of the fractured bone sections, means for securing one of said sets of anchor screws rigidly to one of said clamp members and the second set of anchor screws rigidly to the second clamp member, a universal joint means connecting said clamp members and a single means for rigidly securing said universal joint and clamp members connected thereby in a fixed rigid position.

In testimony whereof I affix my signature.

LEO WEISENBACH.

the said clamp members and bolt and nut cooperating therewith.

9. In a bone fracture clamp the combination of anchor screws adapted to screw into and anchor in each section of a fractured bone, two clamp members slotted so as to slide over the two sets of anchor screws anchored in each of the fractured bone sections, means for securing one of said sets of anchor screws rigidly to one of said clamp members and the second set of anchor screws rigidly to the second clamp member, a universal joint means connecting said clamp members and a single means for rigidly securing said universal joint and clamp members connected thereby in a fixed rigid position.

In testimony whereof I affix my signature.
LEO WEISENBACH.

CERTIFICATE OF CORRECTION.

Patent No. 1,789,060.

Granted January 13, 1931, to

LEO WEISENBACH.

It is hereby certified that the name of the assignee in the above numbered patent was erroneously written and printed as "The King-Scheerer Corporation of America", whereas said name should have been written and printed as The Kny-Scheerer Corporation of America, as shown by the records of assignments in this office; and that the said Letters Patent should be read with this correction therein that the same may conform to the record of the case in the Patent Office.

Signed and sealed this 17th day of February, A. D. 1931.

(Seal)

M. J. Moore,
Acting Commissioner of Patents.

CERTIFICATE OF CORRECTION.

Patent No. 1,789,060. Granted January 13, 1931, to

LEO WEISENBACH.

It is hereby certified that the name of the assignee in the above numbered patent was erroneously written and printed as "The King-Scheerer Corporation of America", whereas said name should have been written and printed as The Kny-Scheerer Corporation of America, as shown by the records of assignments in this office; and that the said Letters Patent should be read with this correction therein that the same may conform to the record of the case in the Patent Office.

Signed and sealed this 17th day of February, A. D. 1931.

(Seal)

M. J. Moore,
Acting Commissioner of Patents.